(12) United States Patent
Biewer et al.

(10) Patent No.: US 10,657,039 B2
(45) Date of Patent: May 19, 2020

(54) CONTROL DEVICE FOR A MOTOR VEHICLE

(71) Applicant: Robert Bosch GmbH, Stuttgart (DE)

(72) Inventors: Alexander Biewer, Rheinstetten (DE); Dieter Thoss, Schwieberdingen (DE); Jens Gladigau, Stuttgart (DE); Christian Haubelt, Kritzmow (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/100,393

(22) PCT Filed: Oct. 13, 2014

(86) PCT No.: PCT/EP2014/071872
§ 371 (c)(1),
(2) Date: May 31, 2016

(87) PCT Pub. No.: WO2015/082109
PCT Pub. Date: Jun. 11, 2015

(65) Prior Publication Data
US 2016/0299839 A1 Oct. 13, 2016

(30) Foreign Application Priority Data
Dec. 3, 2013 (DE) .......... 10 2013 224 702

(51) Int. Cl.
*G06F 12/02* (2006.01)
*G06F 15/173* (2006.01)
(Continued)

(52) U.S. Cl.
CPC ............ *G06F 12/023* (2013.01); *G06F 12/06* (2013.01); *G06F 12/08* (2013.01); *G06F 15/167* (2013.01);
(Continued)

(58) Field of Classification Search
None
See application file for complete search history.

(56) References Cited

U.S. PATENT DOCUMENTS 5,452,461 A * 9/1995 Umekita .................. G06F 8/45
717/146
2003/0204682 A1 10/2003 Ueno et al.
(Continued)

FOREIGN PATENT DOCUMENTS

DE 102009029642 A1 3/2011
DE 102012207212 * 10/2013
(Continued)

OTHER PUBLICATIONS

Machine translation of DE-102012207215 A1 obtained from EPO. org on Jul. 24, 2017.*
(Continued)

*Primary Examiner* — Masud K Khan
(74) *Attorney, Agent, or Firm* — Norton Rose Fulbright US LLP; Gerard Messina

(57) ABSTRACT

A control device for a motor vehicle, the control device including at least two processor cores and a global memory, each processor core respectively including a local memory and each processor core being set up to access only its own local memory and being set up to access neither the local memories of the other processor cores nor the global memory, a coordination unit being set up to read in data from the global memory of the control device and to write it to the local memories of the individual processor cores, and to read in data from the local memories of the individual processor cores and to write it to the global memory and/or to the local memory of the other processor cores.

23 Claims, 1 Drawing Sheet

(51) Int. Cl.
*G06F 12/08* (2016.01)
*G06F 15/167* (2006.01)
*G06F 12/06* (2006.01)

(52) U.S. Cl.
CPC .. *G06F 15/17325* (2013.01); *G06F 2212/173* (2013.01); *G06F 2212/251* (2013.01); *G06F 2212/253* (2013.01)

(56) References Cited

U.S. PATENT DOCUMENTS

| | | | | |
|---|---|---|---|---|
| 2007/0245097 | A1* | 10/2007 | Gschwind | G06F 12/04 711/154 |
| 2009/0307691 | A1* | 12/2009 | Moscibroda | G06F 13/1652 718/100 |
| 2010/0091538 | A1* | 4/2010 | Kim | G06F 13/4234 365/51 |
| 2010/0223429 | A1* | 9/2010 | Cher | G06F 12/0253 711/122 |
| 2012/0084525 | A1* | 4/2012 | Jegu | G06F 13/1663 711/163 |
| 2012/0185671 | A1* | 7/2012 | Bourd | G06F 15/17325 712/27 |
| 2012/0246650 | A1* | 9/2012 | Mueller | G06F 9/5066 718/100 |
| 2013/0305359 | A1* | 11/2013 | Gathala | G06F 21/56 726/22 |
| 2016/0056905 | A1* | 2/2016 | Hartlmueller | H04L 12/40032 375/354 |
| 2016/0087933 | A1* | 3/2016 | Johnson | G06F 8/60 709/245 |

FOREIGN PATENT DOCUMENTS

| | | | | |
|---|---|---|---|---|
| DE | 102012207212 a1 | * | 10/2013 | G01G 23/01 |
| DE | 102012207215 a1 | * | 10/2013 | G06F 11/1629 |
| DE | 102012207215 A1 | | 10/2013 | |
| EP | 1209573 A2 | | 5/2002 | |
| JP | 2009505186 A | | 2/2009 | |
| JP | 2011124204 A | | 6/2011 | |
| TW | 200601229 A | | 1/2006 | |
| WO | WO 2007107457 A1 | | 9/2007 | |
| WO | 2012046266 A1 | | 4/2012 | |

OTHER PUBLICATIONS

International Search Report dated Mar. 9, 2015, of the corresponding International Application PCT/EP2014/071872 filed Oct. 13, 2014, 3 pages.

\* cited by examiner

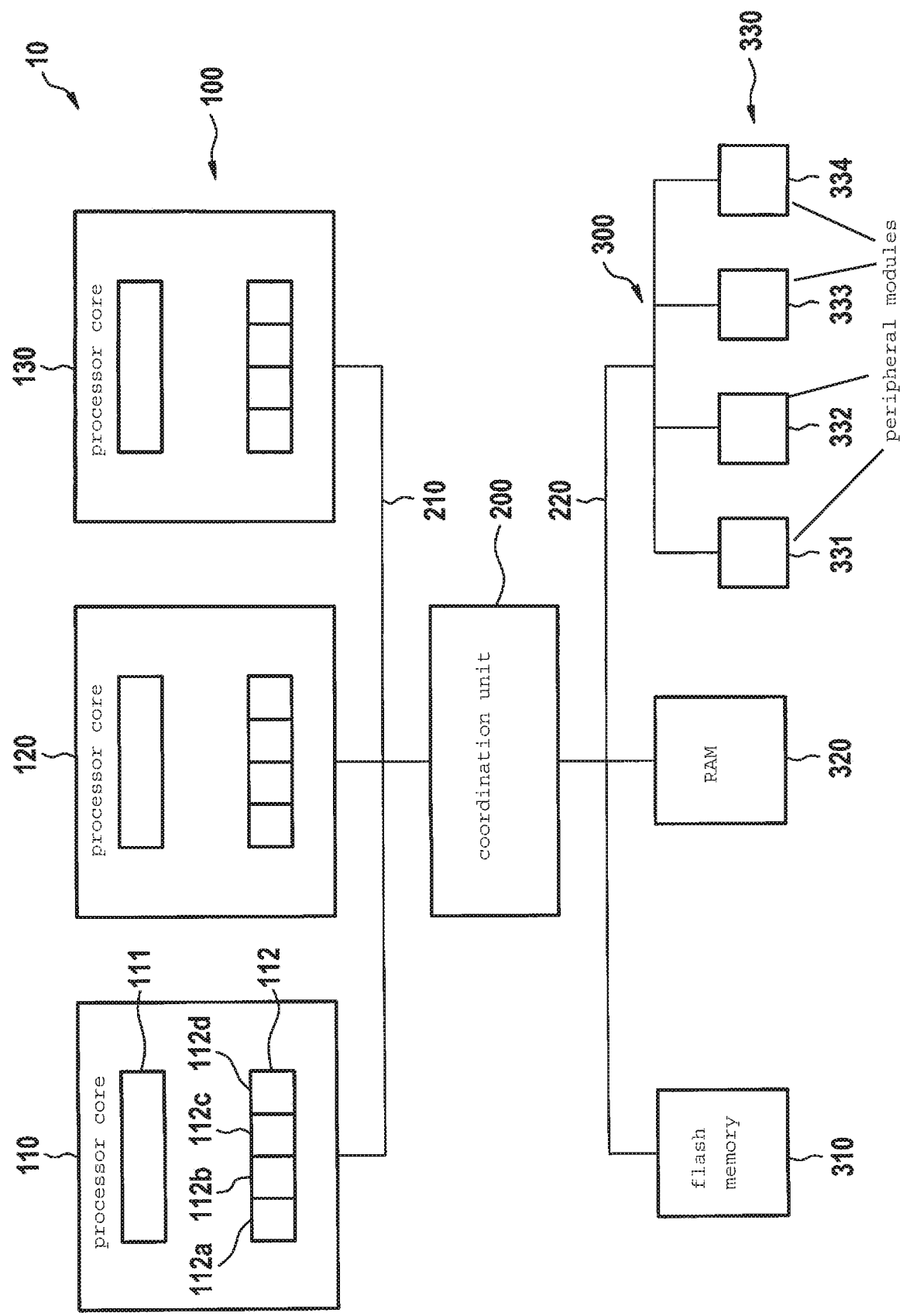

CONTROL DEVICE FOR A MOTOR VEHICLE

FIELD

The present invention relates to a control device for a motor vehicle.

BACKGROUND INFORMATION

Modern control devices of motor vehicles have at least one multicore processor. Multicore processors include a plurality (at least two) of processor cores. A processor core includes an arithmetic-logical unit (ALU) that is the actual electronic computing mechanism for carrying out tasks, programs, computational commands, etc. In addition, a processor core includes a local memory. Such a local memory is fashioned in particular as a register set made up of one or more registers. Control devices also include a global memory. This global memory can include for example flash, NOR flash, or RAM units. Peripheral modules, such as sensors, can also be part of this global memory.

In control devices of motor vehicles, processes are permanently executed by the individual processor cores. In order to execute tasks or processes, the processor cores require in particular a corresponding program code and, if necessary, input data. Such program codes can be stored for example in flash and/or NOR flash memories of the global memory. Input data can be for example acquired measurement data from peripheral modules, such as engine rotational speed, temperatures, pressures, etc.

In order to enable execution of a task or process, a processor core first loads the corresponding data, in particular program code and required input data, into its local memory, because a processor core can access its local memory with a significantly shorter (and more predictable) access time than it can the global memory. A processor core can usually access its local memory within one clock pulse, whereas access to the global memory usually requires between three and ten clock pulses.

The control device and processes running thereon must satisfy particular safety requirements, described for example in ISO standard ISO 26262. Inter alia, a control device has to be real-time-capable. That is, it must be guaranteed that a process is successfully executed within a specified maximum execution time. However, this execution time is decisively determined by the local memory units. Depending on which program code has previously been executed, or whether for example interruptions have occurred, more or less fitting data are situated in the local memory. A maximum execution time can therefore be determined only with difficulty, and for this reason large safety margins are necessary. As a result, due to these planned "safety buffers," the usable computing power of each processor core is reduced.

If two processor cores access the same resources simultaneously, in particular in the global memory, an access collision may occur. It is true that such access collisions occur infrequently, and barely reduce the average computing power of the multicore processor. In order to make it possible to ensure real-time capability, however, this access collision has to be taken into account with a maximum duration ("worst-case"). However, this is often possible only with great difficulty, or not at all. Instead, safety margins can be further increased, which again has a negative effect on the usable computing power.

It is therefore desirable to provide an improved control device for a motor vehicle having a multicore processor. In particular, a real-time capability of the control device is to be ensured, and the usable computing power increased, in a simple manner.

SUMMARY

According to the present invention, a control device for a motor vehicle is proposed. Advantageous embodiments are described below.

The example control device includes at least one multicore processor or at least two single core or multicore processors. The control device therefore includes at least two processor cores. According to the present invention, each processor core can access only its own local memory. In contrast to conventional processors, the individual processor cores can access neither local memories of the other processor cores nor the global memory.

Instead, according to the present invention it is possible for only a coordination unit to access the local memories of each individual processor core and the global memory. The coordination unit can read data out from the global memory of the control device and can write data to the local memories of the individual processor cores. On the other hand, the coordination unit can also read in data from the local memories of the individual processor cores and can write data to the global memory of the control device and/or to the local memories of the other processor cores.

Each processor core can access only its own local memory. In contrast to conventional control devices, it is no longer possible for the individual processor cores to access the global memory or a local memory of the other processor cores. According to the present invention, the coordination unit takes over or coordinates a data exchange between the local memories of the individual processor cores and the global memory, as well as a data exchange between the local memories of the individual processor cores, among one another. In this way, the occurrence of access collisions can be prevented. According to the present invention, it can be avoided that different processor cores simultaneously access the global memory, or simultaneously access the same data of the global memory.

In addition, the individual processor cores can be relieved of stress, because the processor cores no longer have to take care of the transfer and the exchange of data. Time and computing power that the processor cores have to expend for data exchange in conventional control devices can be saved and can be used for the actual functionality of the processor cores. The exchange of data takes place in particular exclusively via the coordination unit, independent of the individual processor cores. Thus, in particular a separation is realized between communication, or data exchange, and the execution of tasks or processes. Thus, it is possible to save specific programming instructing the corresponding processor core to execute a data exchange or memory transfer. As a result, in particular software or programming codes processed or executed on the individual processor cores are simplified. Thus, in particular an execution time required to execute tasks or processes on a processor core is shortened. The computing power of the processor cores can be increased in this way.

The global memory of the control device can for example be a flash memory or a RAM. The local memories of the processor cores can in particular be realized as a flash memory, a NOR flash memory, or a RAM. The global memory can also include peripheral modules. Such peripheral modules are in particular sensors, actuators, analog-digital converters, PWM generators, and/or timers. Such peripheral modules provide in particular data that the processor cores require in particular to execute their functionality or a task. Therefore, the term "global memory" is also intended to include such peripheral modules.

The processor cores can be realized in different ways. For example, the processor cores can each be realized as differently powerful universal cores (16-, 32-, 64-bit, with or without floating-point unit, etc.) or special cores (DSP, image processing, FFT, pattern recognition, etc.).

The present invention makes it possible for a processor core always to be able to access data very quickly, because these data are present in the local memory. This access is comparable to access to a cache. In non-embedded systems (e.g. in PCs), caches are often used instead of local memories. In contrast, local memories are usually used only in control devices and their multicore processors in embedded systems. A cache has the advantage that it accelerates data access of any software without this software having to be specially adapted. The disadvantage of the cache lies in the unpredictability of its content, and thus the unpredictability of the access time to data through a processor core: access to data can be very fast if these data are already present in the cache (cache hit). Access to data can however also take a longer time if these data first have to be loaded into the cache (cache miss). In conventional control devices, for this reason caches are often not used in order to favor predictability. However, through the coordination unit rapid data access (similar to a cache) can be enabled. Here, the coordination unit produces in particular simultaneously corresponding address and control signals for the global and the local memory. In this way, data can flow directly from the local memory to the global memory (and vice versa). This is enabled in particular in that the coordination unit (analogously to a cache controller) transfers in particular between memories.

Thus, through the present invention data can be exchanged between global and local memory (or between local and global memory) much faster, because the data (analogously to a cache) are transferred directly without intermediate storage. This data transfer is in particular not executed with a (comparably) small data word length of a processor core (standardly 32 bits), but rather in particular with a large data word length of a cache or of a cache controller (standardly between 64 and 256 bits). In this way, a data transfer can be accelerated by up to an order of magnitude.

In addition, through the present invention the disadvantages standardly associated with a cache can be overcome. An implementation of the coordination unit in a control device is significantly less complex and is lower in cost than the implementation of a cache. Whereas a cache first loads data when there is a so-called cache miss (all caches are searched without success; i.e. corresponding data are not present in any cache) and a time behavior of the cache is difficult to predict, the coordination unit loads data into the global, or the local, memory effectively and proactively. Through the coordination unit, a time behavior is in contrast much easier to predict, and a real-time capability of the control device or of the multicore processor can be ensured.

Thus, each processor core can access its local memory exactly, or approximately, as quickly as it could access a cache. In addition, waiting times are avoided that can occur in conventional control devices during access to global RAM and flash memories. Access collisions, and resulting wait times, are also avoided. Thus, unpredictable delays (in particular due to simultaneous access to divided resources, i.e. to the global memory) are avoided. Thus, a maximum duration of execution of tasks or processes or software can be precisely determined. The full computing power of the individual processor cores can be used for the execution of these tasks or processes or software. In addition, in this way a particular execution duration can be guaranteed, and real-time capability can be ensured. In addition, the guaranteed execution time can be shortened. Safety margins are avoided.

Because each processor core can access only its own local memory, the individual processor cores are (completely) encapsulated. In this way, the individual processor cores cannot disturb the rest of the system, or the rest of the processor cores. Thus, a further safety requirement can be met that is required according to ISO 26262, the so-called "freedom of interference." According to this, it is ensured that software components do not mutually disturb one another, or that the execution of a task (on a processor core) does not disturb the execution of another task (on another processor core). The coordination unit provides, through its design, such "freedom of interference."

In particular, the coordination unit carries out a data conversion or transformation of the data. In particular, the coordination unit can read in data in the little-endian format, and write it in the big-endian format (and vice versa). In addition, in particular the coordination unit can read in data as floating-point values (double-float) and can write the data as whole-number values (integers) (and vice versa). A data conversion can here be realized in the coordination unit as a parameter of the data transfer (i.e., of the reading and writing of the data) or a specific data transfer operation.

The coordination unit can in particular access the global memory of the control device via a communication infrastructure of the control device. In particular, the coordination unit accesses the global memory via separate or combined buses. In addition, the coordination unit accesses the local memories of the processor cores in particular via a simple bus. In particular, here no crossbar or coupling field is necessary. This bus has in particular a high throughput. Because data are always transmitted in one direction by the coordination unit, in particular in large blocks, the bus may in particular have a high latency. In this way, the implementation can be significantly simplified. In order to satisfy safety requirements, and to recognize and if necessary correct errors during transmission and storage of data by the coordination unit, these buses, as well as the global memory and/or the local memories, can be secured in particular by error correction methods, in particular using an error correcting code (ECC).

Preferably, the reading and writing of data by the coordination unit takes place in application-specific fashion, in particular according to a specific sequence plan. Here, a specific sequence plan is known to the coordination unit, according to which plan the individual processor cores execute particular tasks or process particular processes. Due to this sequence plan, the coordination unit knows at what time which processor core requires which data; i.e., at what time which data have to be written to the local memory of the respective processor core. On the other hand, in this way the coordination unit knows at what time which processor core provides data; i.e., at what time data can be read out from the local memory of the respective processor core. For this sequence plan, in particular periods of particular tasks or particular processes are taken into account. These periods are time intervals in which the tasks or processes are executed by processor cores. The periods thus describe execution times of the individual tasks or processes.

However, the tasks or processes do not necessarily have to be executed within fixed periods of time. Alternatively, the coordination unit can also be provided with a different temporally predictable execution of tasks or processes.

The coordination unit carries out the reading and writing of data preferably in a time-driven manner, in addition in particular corresponding to the periods or the times of execution of individual tasks or individual processes. Thus, the coordination unit carries out the reading and writing of data independent of the individual processor cores. For example, the coordination unit can write data from the global memory to the local memory of a processor core at regular time intervals before the known periodic execution of a particular task or process. So that the time-driven reading and writing of data agrees with the periods of the executed tasks or processes, the coordination unit and the processor cores have in particular a common time base. This common time base can for example be realized via a common clock or a suitable synchronization mechanism. However, the coordination unit can also have its own clock.

In an advantageous embodiment, the coordination unit reads a program code of a task to be executed and/or input data required for a task to be executed from the global memory. The coordination unit writes this read-in program code or these read-in input data as data to the local memory of a processor core. Here, a task is a piece of software. In order to execute or process the task, input data are required. Input data are in particular acquired measurement data from peripheral modules, in particular sensors, for example an engine rotational speed, temperatures, and/or pressures.

In contrast to conventional control devices, a processor core has to load the program code and the input data non-automatically from the global memory into its local memory when this processor core is to execute the corresponding task. Instead, the corresponding program code/input data are supplied to the processor core from the outside by the coordination unit.

Here, the coordination unit can write a program code to the local memory block-by-block, or can also write the program codes of a plurality of tasks simultaneously. In particular, the coordination unit can write the program codes for the next task to be executed by the corresponding processor core to the corresponding local memory. The coordination unit can also sporadically write persistent input data to the local memory, for example if the assignment of which processor core is to execute which task is constantly changing.

Alternatively, the program code of the task to be executed can already be stored in the local memory of a processor core. For example, this program code can be written to the local memory in the course of an initialization phase of the control device. It is also possible for the program code from a preceding execution of the task also to be stored in the local memory. Here, it is also possible for the program code also to be stored in a local flash memory or a (nonvolatile) RAM of the processor core. In these cases, the coordination unit does not have to again read the program code from the global memory and write it to the local memory, but rather only has to instruct the processor core to execute the task.

If the corresponding program code is already stored in the local memory of the processor core, the coordination unit can also store only the input data in the local memory. The coordination unit can here for example read in the input data from a global flash memory or a global RAM of the control device, or directly from individual peripheral modules, in particular from individual sensors.

In a further preferred embodiment, the coordination unit reads in output data, stored by a processor core in its local memory after execution of a task, from this local memory. The coordination unit writes these read-in output data as data to the global memory and/or as data to the local memory of one of the other processor cores. Through execution of the task, the processor core determines the corresponding output data. Output data can for example be injection times and/or injection quantities.

The output data of a processor core can in turn act as input data of another processor core, or can be further processed by another processor core. In this case, the coordination unit writes these output data to the local memory of the corresponding processor core.

In contrast to conventional control devices, the individual processor cores do not automatically write output data during or after execution of a task to the global memory or to the local memory of another processor core. In contrast to conventional control devices, it is also not permitted for the processor cores to directly control peripheral modules, for example actuators, via output data in the form of control signals. Instead, the corresponding output data are fetched from the outside by the coordination unit.

The coordination unit can read in the output data as soon as a processor core has successfully executed a task, or also already while the task is still being executed but the output data have already been written to the local memory. The coordination unit can for example also read in the output data of a plurality of tasks in block-by-block fashion after these tasks have been executed. A block-by-block reading in of the output data of a task that has been executed multiple times is also conceivable.

The end of the execution of a task by a processor core can for example be estimated or predicted through a time progression. The processor core can also signal the end of the execution of the task to the coordination unit, for example using an interrupt or by setting a date in its local memory.

The output data can in particular be control signals for controlling peripheral modules or can contain information as to how peripheral modules are to be controlled. In this case, the coordination unit controls the peripheral modules corresponding to these control signals.

Preferably, the coordination unit assigns tasks that are to be executed to individual processor cores, and/or instructs individual processor cores to execute particular tasks. The coordination unit thus coordinates in particular which tasks are executed by which processor cores. In particular, the coordination unit coordinates the individual tasks in accordance with the sequence plan described above. The coordination unit communicates a corresponding start address of the corresponding task in particular to the individual processor cores. In addition, in particular the coordination unit signals to the individual processor cores when they are to begin the execution of the individual tasks. This can for example be realized by an interrupt to the corresponding processor core or by setting a timer in the processor core. The coordination unit can also instruct the corresponding processor core to start a new task immediately after the successful execution of the current task.

In particular, the coordination unit assigns the tasks that are to be executed to the individual processor cores in such a way that tasks or corresponding software components from different sources are executed on different processor cores. Here, for each software component corresponding input data and output data are specified so that the coordination unit can store the input data correctly in the local memory of the respective processor core and can correspondingly read in the output data. The coordination unit here has in particular knowledge relating to a duration of execution of the individual tasks or software components. The software components can originate in a useful programming language using any toolchain. The software component is present in particular as a finished program code or object code. This program code here does not have to be relocatable (adaptable to particular memory addresses), because each processor core has its own local memory and thus has its own address space.

Because the coordination unit can rapidly convert or transform data, the data can in particular be differently coded. Thus, in particular modern software components that use floating-point can work together with older software components that use integers. The coordination unit here carries out a necessary data conversion and thus a clear "translation" of individual data. This makes it possible to migrate differently coded software components to a more modern structure and to use more modern programming languages and tool chains. Alternatively, different structures can usefully also permanently be used in parallel.

Preferably, the coordination unit instructs a plurality of processor cores to execute a particular task. The coordination unit subsequently compares the individual output data of these processor cores with one another. Alternatively or in addition, the coordination unit instructs a processor core to execute a particular task multiple times. In this case as well, the coordination unit compares the individual output data of this multiple execution of the processor core with one another. The coordination unit can also compare these output data with one another using a majority decision. This redundant execution of tasks is useful in particular when there are high safety requirements.

Preferably, the coordination unit controls the individual processor cores. In the course of this, the coordination unit can interrupt the individual processor cores, reset them, take them out of operation, test them, put them into a power saving mode, and/or modify a clock frequency of the individual processor cores. The coordination unit can thus control each processor core appropriately without at the same time disturbing or influencing the other processor cores. In particular, the coordination unit can test the individual processor cores at regular time intervals. "Doubtful" processor cores that may have a defect can be taken out of operation by the coordination unit. In this case, the coordination unit can assign tasks that were assigned to this processor core taken out of operation to other processor cores. In particular, these tasks can be assigned to a reserve processor core that is kept open, and can be executed by this processor core. In addition, the coordination unit can cause a self-test (BIST) to run on the processor core taken out of operation.

Preferably, for the individual processor cores the coordination unit can also trigger one or various interrupts. In this way, for example delays or memory access errors can be displayed by the coordination unit. An interrupt can also be used for a sequence plan: as soon as the writing of data to the local memory of a processor core is terminated, the coordination unit can, using an interrupt, instruct the processor core to execute the corresponding task. In particular, a maximum duration in clock pulses can be assigned to a data transfer, i.e., the writing and reading of the data. If the data transfer is not terminated within this time, the coordination unit triggers an interrupt at the corresponding processor core. In addition, in particular a minimum duration in clock pulses can be assigned to a data transfer operation. If the data transfer is terminated in a time that is shorter than this minimum duration, waiting takes place for the rest of the clock pulses. In addition, the coordination unit enables in particular a modulo wait operation. In this way, for example given variable durations of data transfers synchronization to a specified period can take place. In addition, the coordination unit can also contain an absolute time wait operation, whereby waiting takes place for a specified number of clock pulses.

Preferably, the individual local memories of the processor cores are each divided into different memory banks. The coordination unit controls or defines or sets which memory banks may be accessed by the respective processor core. In this way, the coordination unit can at all times access those memory banks of a processor core to which the processor core is not allowed to have access, without influencing the operation of the processor core. Thus, the execution time of the processor core remains predictable. While the processor core operates on those memory banks to which it is permitted to have access and executes the task, the coordination unit can already prepare the next task at the remaining memory banks, and in particular can already store in these remaining memory banks program code and/or input data to be executed next by the corresponding processor core. In this way, an expensive dual-ported RAM is not necessary. In particular, each processor core has at least four memory banks. The number and size of the memory banks can however also be selected differently for the individual processor cores, depending on the area of use of the individual processor cores.

In a preferred embodiment of the present invention, the coordination unit is fashioned as a part of a processor core. Here, in particular a plurality of processor cores can each have a coordination unit. In particular, in addition each processor core has its own individual coordination unit. These individual coordination units respectively coordinate the reading and writing of data of the respective assigned processor cores. The individual coordination units are connected among one another and can mutually coordinate one another in order to prevent a plurality of coordination units from simultaneously accessing the same data, so that access collisions are prevented.

Alternatively or in addition, the coordination unit is preferably fashioned as a separate component or hardware element. In particular, the coordination unit can be fashioned as a controller or also as a separate processor core. An embodiment as a controller makes sense in particular in a bus system having masters and slaves. Here, it is also possible for a plurality of these coordination units to be present. Such a coordination unit here ensures in particular the highest data read and write speed, the highest degree of security, and the greatest availability.

Such a coordination unit fashioned as a hardware element has in particular a master port for reading and writing the data, and also in particular has its own local memory. In addition, the coordination unit has in particular one or more (master) interfaces to the individual processor cores, in particular having, respectively, one or more slave ports per processor core. In particular, the coordination unit can also have a counter that acquires a number of clock pulses since the starting of the coordination unit.

In addition, the coordination unit in particular has an appropriate logic or logical unit, in particular an arithmetic-logical unit (ALU). Using this logic unit, the coordination unit can execute an appropriate programming. The term "coordination unit" is in particular intended also to include this programming, or in general a piece of software executed on a corresponding hardware element.

The term "coordination unit" is thus intended to include both a corresponding hardware element and also a corresponding executed piece of software.

Here, in particular, this programming is stored in the local memory of the coordination unit. Alternatively, the programming can also be stored in the global memory of the control device or in a local memory of a processor core. The programming is processed in particular sequentially by the coordination unit. The programming is used in particular for a configuration of the coordination unit.

Analogous to the processor cores, the coordination unit operates using a clock pulse. At each clock pulse, the coordination unit can in particular process or put to sleep an operation. The clock pulse here can be the processor clock, but can also be asynchronous thereto, such as a clock of a communication medium. The programming of the coordination unit can in particular be a list of data transfer operations, wait operations, and jump operations, in any sequence. A data transfer operation here contains in particular a read address from which the data are read, and a memory address to which the data are to be written. In addition, a data transfer operation contains a number of data words that are to be transferred, as well as optional instructions for recoding data. A wait operation contains in particular a numerical value that indicates how many clock pulses the coordination unit is to sleep. A specific value (such as zero) here in particular means "sleep until further notice." A jump operation contains in particular a memory address that indicates where the operation is situated that is to be processed next by the coordination unit.

Further advantages and embodiments of the present invention result from the description below and the FIGURE.

It will be understood that the features named above and explained below may be used not only in the respectively indicated combination, but also in other combinations or by themselves, without departing from the scope of the present invention.

The present invention is shown schematically in the drawing on the basis of an exemplary embodiment, and is described in detail in the following with reference to the FIGURE.

BRIEF DESCRIPTION OF THE DRAWING

FIG. 1 schematically shows a preferred embodiment of a control device according to the present invention for a motor vehicle.

DETAILED DESCRIPTION OF EXAMPLE EMBODIMENTS

In FIG. 1, a preferred embodiment of a control device according to the present invention for a motor vehicle is shown schematically and is designated 10.

Control device 10 here includes a multicore processor 100. In this example, multicore processor 100 includes three processor cores 110, 120, and 130. The design of a processor core is explained in the following with reference to the example of processor core 110. The other processor cores 120 and 130 are in particular realized analogously to processor core 110.

Processor core 110 has an arithmetic-logical unit (ALU) 111 and a local memory 112. Local memory 112 can in particular be fashioned as a local flash memory or RAM. In particular, local memory 112 is divided into memory banks 112a through 112d.

In addition, control device 10 has a global memory 300. This global memory can include a flash memory 310, a RAM 320, and a peripheral unit 330. Peripheral unit 330 here includes peripheral modules 331 through 334, which can be fashioned for example as sensors, actuators, analog-digital converters, PWM generators, or timers.

Each of the processor cores 110, 120, and 130 can exclusively access its own local memory, and can access neither the local memory of a different processor core nor global memory 300. Thus, for example processor core 110 can access exclusively its own local memory 112, and can read data only from this memory, or can write data only to this memory. Processor core 110 can access neither the local memories of the other processor cores 120 and 130, nor global memory 300.

In addition, control device 10 has a coordination unit 200. This coordination unit 200 is fashioned in particular as a separate hardware element on which corresponding software runs. Coordination unit 200 is networked, respectively via a bus 210 or 220, with processor cores 110, 120, and 130 of multicore processor 100, and with global memory 300.

Coordination unit 200 instructs individual processor cores 110, 120, 130 to execute various tasks. Here, coordination unit 200 first reads a corresponding program code from flash memory 310 or from RAM 320 of global memory 300, and writes these data to the local memory of the processor core that is to execute the task. In this example, coordination unit 200 writes the program code to local memory 112 of processor core 110.

Here, coordination unit 200 writes the program code to specified memory banks of local memory 112, for example to memory bank 112a. In addition, coordination unit 200 reads in input data that processor core 110 requires for the execution of the task. For example, these input data are measurement values acquired by a sensor 331 in peripheral equipment 330. Coordination unit 200 reads in these measurement values and stores them as data, for example in memory bank 112b of local memory 112 of processor core 110. If warranted, coordination unit 200 carries out a conversion between data that are read and data that are to be written.

Coordination unit 200 thereupon instructs processor core 110 to execute the task, in particular using an interrupt. ALU 111 of processor core 110 executes the program code stored in memory bank 112a using the input data stored in memory bank 112b. Here, output data are produced that processor core 110 also for example stores in memory bank 112b.

Coordination unit 200 reads in these output data from memory bank 112b, and stores these data for example as data in flash memory 310 or in RAM 320 of global memory 300.

What is claimed is:

1. A control device, comprising:
a multicore processor having at least two processor cores;
a global memory, wherein each of the processor cores respectively includes a local memory, each of the processor cores being configured to access only its own local memory, and each of the processor cores being configured so that it cannot access the local memories of the others of the processor cores and being configured so that it cannot access the global memory; and
a coordination unit configured to: (i) transfer data, in accordance with a sequence plan available to the coordination unit, from the global memory of the control device, directly without intermediate storage, to the local memories of the processor cores, and (ii) transfer data, in accordance with the sequence plan available to the coordination unit, from the local memories of individual ones of the processor cores, directly without intermediate storage, to at least one of: the global memory or the local memory of another of the processor cores;

wherein the coordination unit is configured to: (i) assign a task to each of the at least two processor cores in accordance with the sequence plan available to the coordination unit, and/or (ii) instruct each of the at least two processor cores to perform the task in accordance with the sequence plan available to the coordination unit;

wherein the coordination unit includes a controller or a processor;

wherein the coordination unit coordinates a data exchange between the local memories of the processor cores of the multicore processor and the global memory, as well as a data exchange between the local memories of the processor cores of the multicore processor, among one another, so as to prevent an occurrence of data access collisions, wherein the coordination unit is configured to run software, and is networked via a bus with the processor cores of the multicore processor.

2. The control device as recited in claim 1, wherein the coordination unit is configured to execute the transfer of data from the global memory by transferring to the local memories of the processor cores at least one of: i) a program code of a task that is to be executed, and ii) input data required for a task that is to be executed, directly without intermediate storage to the local memory of the processor cores.

3. The control device as recited in claim 1, wherein the coordination unit is configured to transfer output data, stored by a processor core in its local memory after executing a task, from this local memory, directly without intermediate storage to at least one of: i) the global memory, and ii) the local memory of one of the other processor cores.

4. The control device as recited in claim 1, wherein the coordination unit is configured to at least one of: i) assign tasks that are to be executed to each of the processor cores, and ii) instruct each of the processor cores to execute specified tasks.

5. The control device as recited in claim 1, wherein at least one of: i) the coordination unit is configured to instruct a plurality of processor cores to execute a specified task and to compare the individual output data of the processor cores with one another, and ii) the coordination unit is configured to instruct a processor core to execute a specified task multiple times and to compare the individual output data of this multiple execution by the processor core with one another.

6. The control device as recited in claim 1, wherein the coordination unit is configured to control each of the processor cores and in the course thereof to at least one of: i) interrupt the individual processor cores, ii) reset them, iii) take them out of operation, iv) test them, v) put them into a power saving mode, vi) trigger an interrupt at the processor cores, and vii) modify a clock frequency of the processor cores.

7. The control device as recited in claim 1, wherein the individual local memories of the processor cores are each divided into different memory banks, and the coordination unit is configured to control which memory banks the respective processor core is permitted to access.

8. The control device as recited in claim 1, wherein the coordination unit is realized either as a part of a processor core, or as a separate hardware element.

9. The control device as recited in claim 1, wherein the control device is for a motor vehicle.

10. The control device as recited in claim 1, wherein: (i) the transfer of data from the global memory of the control device, directly without intermediate storage, to the local memory of each of the processor cores, by the coordination unit is independent of the processor cores, and (ii) wherein the transfer of data from the local memories of the individual ones of the processor cores, directly without intermediate storage, to the at least one of: the global memory or the local memories of the other processor cores, by the coordination unit, is independent of the processor cores.

11. A control device, comprising:
a multicore processor having at least two processor cores;
a global memory, wherein each of the processor cores respectively includes a local memory, each of the processor cores being configured to access only its own local memory, and each of the processor cores being configured so that it cannot access the local memories of the others of the processor cores and being configured so that it cannot access the global memory; and
a coordination unit configured to: (i) transfer data, independent of the processor cores and in accordance with a sequence plan available to the coordination unit, from the global memory of the control device to the local memories of the processor cores, and (ii) transfer data, independent of the processor cores and in accordance with the sequence plan available to the coordination unit, from the local memories of individual ones of the processor cores to at least one of: the global memory, or the local memory of another of the processor cores;
wherein the coordination unit is configured to: (i) assign a respective task to each of the at least two processor cores in accordance with the sequence plan available to the coordination unit, and/or (ii) instruct each of the at least two processor cores to perform the respective task in accordance with the sequence plan available to the coordination unit;
wherein the coordination unit includes a controller or a processor;
wherein the coordination unit coordinates a data exchange between the local memories of the processor cores of the multicore processor and the global memory, as well as a data exchange between the local memories of the processor cores of the multicore processor, among one another, so as to prevent an occurrence of data access collisions,
wherein the coordination unit is configured to run software, and is networked via a bus with the processor cores of the multicore processor.

12. The control device as recited in claim 11, wherein the coordination unit is configured to execute the transfer of the data from the global memory, and the transfer of the data from the local memories of the individual ones of the processor cores, in at least one of: i) an application-specific manner, and ii) in a time-driven manner.

13. The control device as recited in claim 11, wherein the coordination unit is configured to execute the transfer of the data from the global memory to the local memories of the processor cores by transferring at least one of: i) a program code of a task that is to be executed, and ii) input data required for a task that is to be executed.

14. The control device as recited in claim 11, wherein the coordination unit is configured to read in output data, stored by a processor core in its local memory after executing a task, from this local memory, and to at least one of: i) write it as data to the global memory, and ii) write it as data to the local memory of one of the other processor cores.

15. The control device as recited in claim 11, wherein the coordination unit is configured to at least one of: i) assign tasks that are to be executed to each of the processor cores, and ii) instruct each of the processor cores to execute specified tasks.

16. The control device as recited in claim 11, wherein at least one of: i) the coordination unit is configured to instruct a plurality of processor cores to execute a specified task and is configured to compare the individual output data of the processor cores with one another, and ii) the coordination unit is configured to instruct a processor core to execute a specified task multiple times and is configured to compare the individual output data of this multiple execution by the processor core with one another.

17. The control device as recited in claim 11, wherein the coordination unit is configured to control each of the processor cores and in the course thereof to at least one of: i) interrupt the individual processor cores, ii) reset them, iii) take them out of operation, iv) test them, v) put them into a power saving mode, vi) trigger an interrupt at the processor cores, and vii) modify a clock frequency of the processor cores.

18. The control device as recited in claim 11, wherein the local memories of the processor cores are each divided into different memory banks, and the coordination unit is configured to control which memory banks the respective processor core is permitted to access.

19. The control device as recited in claim 11, wherein the coordination unit is realized as a part of a processor core or as a separate hardware element.

20. The control device as recited in claim 11, wherein the control device is for a motor vehicle.

21. The control device as recited in claim 11, wherein for each respective processor core of the at least two processor cores, the coordination unit is configured to read program code for the respective task from the global memory and write the program code to the local memory of the respective processor core.

22. The control device as recited in claim 11, wherein during the transfer of data from the global memory of the control device to the local memories of the processor cores, the coordination unit is configured to transform the data from a first format to a second format, the first format being different from the second format, the first format being a format of the data as it is stored in the global memory, and the second format being a format of the data as it is to be stored in the local memories of the processor cores after the transfer.

23. The control device as recited in claim 11, wherein during the transfer of data from the local memories of individual ones of the processor cores to at least one of: the global memory, or the local memory of another of the processor cores, the coordination unit is configured to transform the data from a first format to a second format, the first format being different from the second format, the first format being a format of the data as it is stored in the local memories of the individual ones of the processor cores, and the second format being a format of the data as it is to be stored in the global memory or the local memory of the another of the processor cores.

* * * * *